(12) United States Patent
Dalluge et al.

(10) Patent No.: US 8,205,633 B2
(45) Date of Patent: Jun. 26, 2012

(54) COLLETS FOR USE WITH VALVES

(75) Inventors: Paul Russell Dalluge, Marshalltown, IA (US); Larry Joseph Weber, Marshalltown, IA (US)

(73) Assignee: Fisher Controls International, LLC, Marshalltown, IA (US)

( * ) Notice: Subject to any disclaimer, the term of this patent is extended or adjusted under 35 U.S.C. 154(b) by 755 days.

(21) Appl. No.: 12/262,958

(22) Filed: Oct. 31, 2008

(65) Prior Publication Data

US 2010/0108931 A1    May 6, 2010

(51) Int. Cl.
*F16K 1/22* (2006.01)

(52) U.S. Cl. ............. 137/315.22; 251/304; 251/305

(58) Field of Classification Search ........... 251/305, 251/304; 279/2.02, 2.06, 2.19, 70, 71, 72, 279/66; 403/383, 371; 464/58; 137/315.22
See application file for complete search history.

(56) References Cited

U.S. PATENT DOCUMENTS

| | | | |
|---|---|---|---|
| 172,689 A | 1/1876 | Barrett | |
| 1,521,202 A | 12/1924 | Osgood | |
| 1,857,012 A | 5/1932 | Corley | |
| 2,602,672 A * | 7/1952 | Wiard | 279/2.02 |
| 2,835,498 A * | 5/1958 | Howes | 279/51 |
| 2,888,282 A * | 5/1959 | Naimer | 403/357 |
| 3,141,678 A | 7/1964 | Garrison | |
| 3,190,609 A | 6/1965 | Kintigh | |
| 3,727,928 A * | 4/1973 | Benjamin | 279/133 |
| 3,839,882 A | 10/1974 | Gilarski, Jr. | |
| 4,202,644 A * | 5/1980 | Soussloff | 403/369 |
| 4,282,419 A | 8/1981 | Auer | |
| 4,808,049 A * | 2/1989 | Cook | 409/234 |
| 4,909,095 A | 3/1990 | Carlson | |
| 4,940,249 A | 7/1990 | Drbal | |
| 5,100,420 A | 3/1992 | Green et al. | |
| 5,176,464 A | 1/1993 | Tanner | |

(Continued)

FOREIGN PATENT DOCUMENTS

DE    3827428    2/1990

(Continued)

OTHER PUBLICATIONS

International Searching Authority, "International Search Report," issued in connection with corresponding international application serial No. PCT/US2009/057870, mailed Dec. 22, 2009, 4 pages.

(Continued)

*Primary Examiner* — Stephen M Hepperle
*Assistant Examiner* — Minh Le
(74) *Attorney, Agent, or Firm* — Hanley, Flight & Zimmerman, LLC

(57) ABSTRACT

Collets for coupling rotary actuators to valves are disclosed. An example collet includes a plurality of flexible members configured to be coupled to an elongated member and each having an inner surface that forms at least a portion of a substantially rectangular bore configured to receive a rectangular shaft. The plurality of flexible members form an involute outer surface for engaging an involute inner surface of an opening of a lever. The opening of the lever is configured to cause the plurality of flexible members to be displaced toward an axis of the elongated member to cause the inner surface of each of the plurality of flexible members to engage one or more surfaces of the rectangular shaft.

21 Claims, 5 Drawing Sheets

U.S. PATENT DOCUMENTS

| | | | |
|---|---|---|---|
| 5,197,738 | A | 3/1993 | Hartman, Sr. |
| 5,744,773 | A | 4/1998 | Van Otteren et al. |
| 5,823,499 | A | 10/1998 | Ito et al. |
| 5,975,106 | A | 11/1999 | Morgan et al. |
| 6,193,241 | B1 * | 2/2001 | Robison ............... 279/137 |
| 6,461,084 | B1 | 10/2002 | Stuart |
| 6,666,129 | B1 | 12/2003 | Schmid et al. |
| 6,742,786 | B2 | 6/2004 | Casel et al. |
| 6,857,448 | B2 | 2/2005 | Schwartzman |
| 7,090,257 | B2 | 8/2006 | Werth |
| 7,740,228 | B2 * | 6/2010 | Simpson et al. ......... 251/308 |
| 7,955,021 | B2 * | 6/2011 | Brestel et al. .......... 403/371 |
| 2003/0014854 | A1 | 1/2003 | Brown |
| 2003/0078616 | A1 | 4/2003 | Ginn et al. |
| 2003/0084556 | A1 | 5/2003 | Dunlop |
| 2004/0255418 | A1 | 12/2004 | Minkler et al. |
| 2005/0047885 | A1 | 3/2005 | Hyatt et al. |
| 2005/0222614 | A1 | 10/2005 | Ginn et al. |
| 2005/0274416 | A1 * | 12/2005 | Engle et al. ............ 137/247 |
| 2006/0175770 | A1 * | 8/2006 | Linzell ................. 279/71 |
| 2006/0255303 | A1 * | 11/2006 | Denike et al. .......... 251/305 |
| 2007/0034258 | A1 * | 2/2007 | Parsons et al. ......... 137/269 |
| 2007/0246900 | A1 | 10/2007 | Oshnock et al. |
| 2008/0048403 | A1 * | 2/2008 | Oldberding et al. ...... 279/2.01 |
| 2008/0197312 | A1 * | 8/2008 | Brinks ................. 251/305 |
| 2009/0304443 | A1 | 12/2009 | Moore |
| 2010/0108930 | A1 | 5/2010 | Helfer et al. |
| 2010/0176562 | A1 * | 7/2010 | Linzell ................ 279/123 |
| 2010/0274281 | A1 | 10/2010 | Ginn et al. |

FOREIGN PATENT DOCUMENTS

| | | |
|---|---|---|
| DE | 3927396 | 10/1990 |
| EP | 0524589 | 1/1993 |
| GB | 2327463 | 1/1999 |
| GB | 2327464 | 1/1999 |

OTHER PUBLICATIONS

International Searching Authority, "Written Opinion of the International Searching Authority," issued in connection with corresponding international application serial No. PCT/US2009/057870, mailed Dec. 22, 2009, 5 pages.

International Searching Authority, "International Search Report," issued in connection with international application serial No. PCT/US2009/057873, mailed Dec. 22, 2009, 4 pages.

International Searching Authority, "Written Opinion of the International Searching Authority," issued in connection with international application serial No. PCT/US2009/057873, mailed Dec. 22, 2009, 5 pages.

International Searching Authority, "International Search Report," issued in connection with international application serial No. PCT/US2009/057876, mailed Dec. 22, 2009, 4 pages.

International Searching Authority, "Written Opinion of the International Searching Authority," issued in connection with international application serial No. PCT/US2009/057876, mailed Dec. 22, 2009, 6 pages.

United States Patent and Trademark Office, "Non-Final Office Action," issued in connection with U.S. Appl. No. 12/262,983, mailed May 25, 2010, 30 pages.

United States Patent and Trademark Office, "Final Office Action," issued in connection with U.S. Appl. No. 12/262,967, mailed Dec. 12, 2011, 16 pages.

International Bureau, "International Preliminary Report on Patentability," issued in connection with international application serial No. PCT/US2009/057870, issued May 3, 2011, 6 pages.

International Bureau, "International Preliminary Report on Patentability," issued in connection with international application serial No. PCT/US2009/057873, issued May 3, 2011, 6 pages.

United States Patent and Trademark Office, "Notice of Allowance," issued in connection with U.S. Appl. No. 12/262,983, mailed Feb. 2, 2011, 15 pages.

United States Patent and Trademark Office, "Notice of Panel Decision from Pre-Appeal Brief Review," issued in connection with U.S. Appl. No. 12/262,983, mailed Jan. 26, 2011, 2 pages.

United States Patent and Trademark Office, "Final Office Action," issued in connection with U.S. Appl. No. 12/262,983, mailed Sep. 3, 2010, 16 pages.

Metso Automation, "Pneumatic Double Diaphragm Actuator Series E," published Jul. 2002, 8 pages.

United States Patent and Trademark Office, "Non-Final Office Action," issued in connection with U.S. Appl. No. 12/262,967, mailed Aug. 31, 2011, 28 pages.

United States Patent and Trademark Office, "Non-Final Office Action," issued in connection with U.S. Appl. No. 12/262,967, mailed Mar. 27, 2012, 17 pages.

\* cited by examiner

COLLETS FOR USE WITH VALVES

FIELD OF THE DISCLOSURE

The present disclosure relates generally to control valves and, more particularly, to collets for use with valves.

BACKGROUND

Fluid process systems typically use valves such as, for example, rotary valves to control the flow of process fluids. In general, rotary valves typically include a fluid flow control member disposed in a fluid path and rotatably coupled to the body of the rotary valve via a shaft. Typically, a portion of the shaft extending from the rotary valve is operatively coupled to an actuator (e.g., a pneumatic actuator, an electric actuator, a hydraulic actuator, etc.), which operates the flow control member. To couple the actuator to the valve shaft, a lever or lever arm is typically employed. The lever converts a linear displacement of an actuator stem into a rotational displacement of the valve shaft. Thus, rotation of the lever causes the valve shaft and the flow control member (e.g., a disk, a ball, etc.) to rotate to increase or restrict the flow of fluid through the valve. In operation, a controller may be used to control the displacement of the actuator to rotate the lever and the valve shaft and, thus, the flow control member of the valve to a desired angular position to achieve a desired fluid flow through the rotary valve.

However, shaft couplings such as, for example, levers, that convert linear translation into rotational movement of a valve shaft are often prone to backlash. Backlash, which occurs if the lever is not properly sized to the shaft, and leaves clearance between contacting surfaces of the lever and the shaft which results in lost motion and reduced accuracy of fluid flow control through the valve. Additionally, Industry standards (e.g., International Organization for Standardization) may require an actuator to couple to differently sized valve shafts. Adherence to the ISO standard requires that actuators and valves made by multiple or different manufacturers can be interchangeably coupled to each other without requiring modification of the actuators or the valves. To substantially reduce backlash from inaccurately sized couplings and to facilitate the compatibility of control valves with a variety of actuators, many available actuators have shaft couplings such as, for example, a lever adapted with a collet to receive a valve shaft. In particular, many off-the-shelf actuators provide collets having a square bore or opening to receive differently sized square valve shafts.

However, to prevent lost motion from occurring between the lever and the square valve shaft, the collet must provide sufficient clamping force to the square end of the valve shaft. Failure to provide a sufficient clamping force between the collet and the valve shaft typically results in a loose mechanical coupling and, thus, lost motion between the lever and the valve shaft. Such lost motion may lead to inaccurate positioning of the flow control member and, thus, poor control over the fluid flowing through the valve.

SUMMARY

In one example, a shaft coupling assembly for use with rotary valves includes an elongate member having a first end and a second end in which the first end includes a coupling portion having an involute outer surface and a first opening configured to receive a rectangular shaft. The coupling portion includes at least one flexible member having a first surface that at least partially defines the first opening and a second surface that at least partially defines the involute outer surface. The shaft coupling assembly further includes a sleeve having a second opening to receive the elongate member and a third opening having an involute radius configured to receive the involute outer surface of the coupling portion.

In another example, a collet for use with a rectangular shaft includes a plurality of flexible members configured to be coupled to an elongated member and each having an inner surface that forms at least a portion of a substantially rectangular bore configured to receive the rectangular shaft. The plurality of flexible members form an involute outer surface for engaging an involute inner surface of an opening of a lever. The opening of the lever is configured to cause the plurality of flexible members to be displaced toward an axis of the elongated member to cause the inner surface of each of the plurality of flexible members to engage one or more surfaces of the rectangular shaft.

In yet another example, a rotary control valve includes a valve mounted to a housing and having a shaft. An actuator is operatively coupled to the valve and disposed within the housing. A collet has a plurality of flexible members integrally formed with an elongated member such that the outer surfaces of the plurality of flexible members form an involute outer surface and inner surfaces of the plurality of flexible members form a first opening to receive the shaft. A lever operatively coupled to the actuator has a second opening to receive the elongate member of the collet and a third opening having a tapered involute surface to engage the involute outer surface defined by the outer surfaces of the plurality of flexible members.

DETAILED DESCRIPTION

The example collets disclosed herein may be used to couple differently sized, substantially square or rectangular valve shafts to control valve actuators. As used herein, the term substantially rectangular includes substantially square geometries. In contrast to known coupling techniques, the example collets described herein are configured to provide a substantially tight coupling between a lever and a substantially rectangular (e.g., square) shaft without requiring the use of wedges, shaft keys, or the like. In operation, the example collets described herein substantially eliminate lost motion between actuators and closure members (e.g., a valve plug). In addition, the example collets described herein may facilitate the coupling and de-coupling of actuators and valve shafts for purposes of, for example, installation processes, repair processes, etc.

As described in greater detail below, an example collet may include at least one flexible member (e.g., a tang, finger-like projection, etc.) having a substantially planar inner surface configured to engage a rectangular or square shaft. In addition, the flexible member includes a substantially inwardly curved or involute outer surface configured to engage a tapered involute surface of a coupling component such as, for example, a lever or a sleeve. The flexible member may be coupled to a first end of an elongate member and displaced toward an axis of the elongate member by the coupling component. In general, any number of flexible members may be used to implement the example collets described herein. For example, as described below in connection with FIGS. 2A and 2B, the example collet 122 includes four flexible members 228*a-d*. However, as described below in connection with FIGS. 3A and 3B, another example collet 300 includes eight flexible members or clamping elements 306*a-h*.

The involute outer surfaces of the example collets described herein advantageously provides the flexible members with thicker dimensioned material adjacent corners of an opening defined by the flexible members, where the most effective torque transmission occurs between a collet and a valve shaft to which the collet is coupled. Such thicker material adjacent the corners of the opening defined by the flexible members enables the flexible members to apply a sufficient or more effective clamping force to the corners of a valve shaft (e.g., a square shaft). Additionally, the involute surfaces of the example flexible members described herein engage the involute inner surfaces of the coupling component (e.g., a lever) to provide a substantially tight fit or connection between the coupling component and the collet to further prevent or minimize lost motion between the coupling component and the collet and, thus, lost motion between the actuator and flow control member of the valve associated with the coupling component and the collet.

Figure 1A:
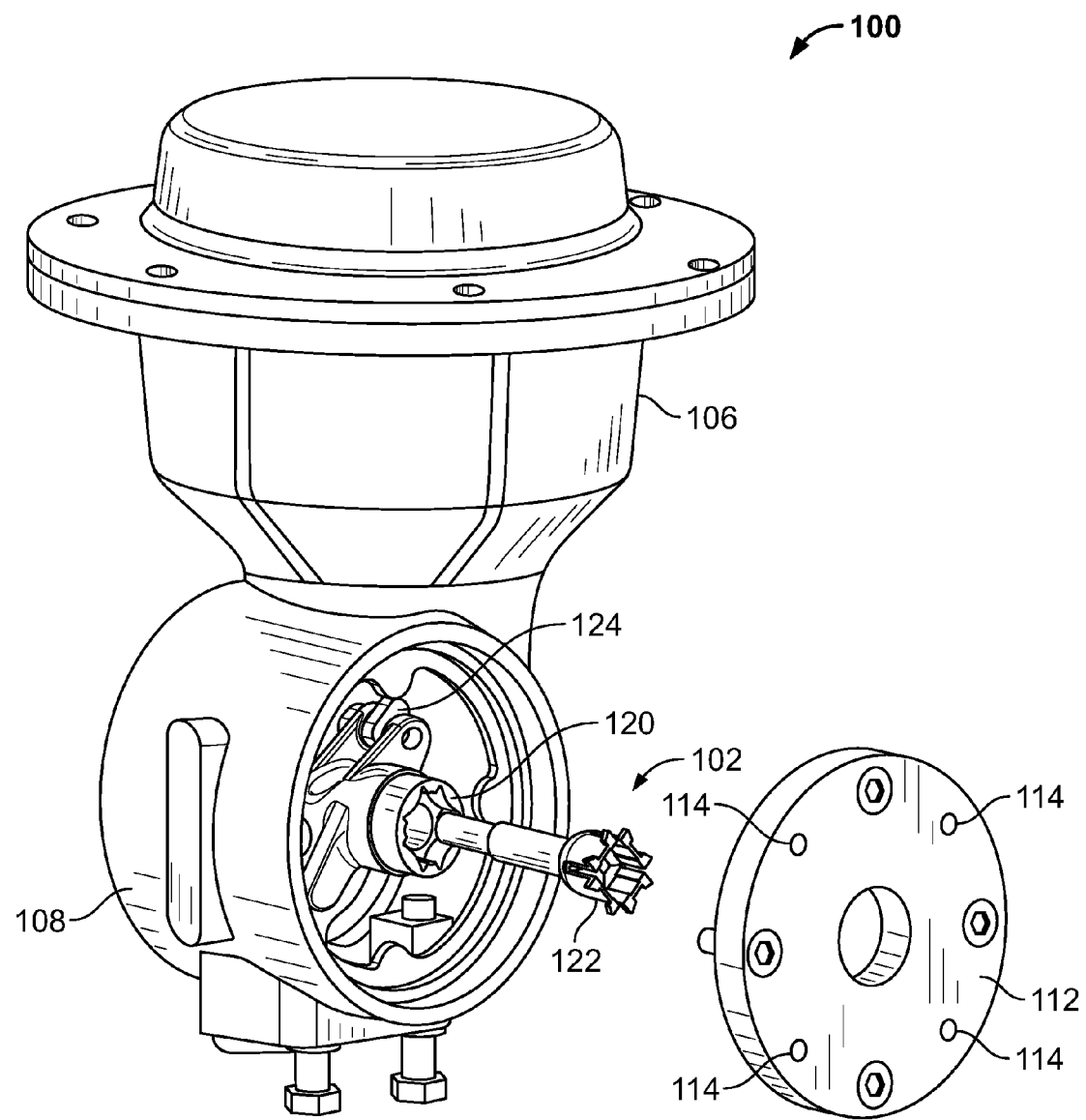
FIG. 1A illustrates an example rotary control valve assembly having an example collet and lever described herein.
Figure 1B:
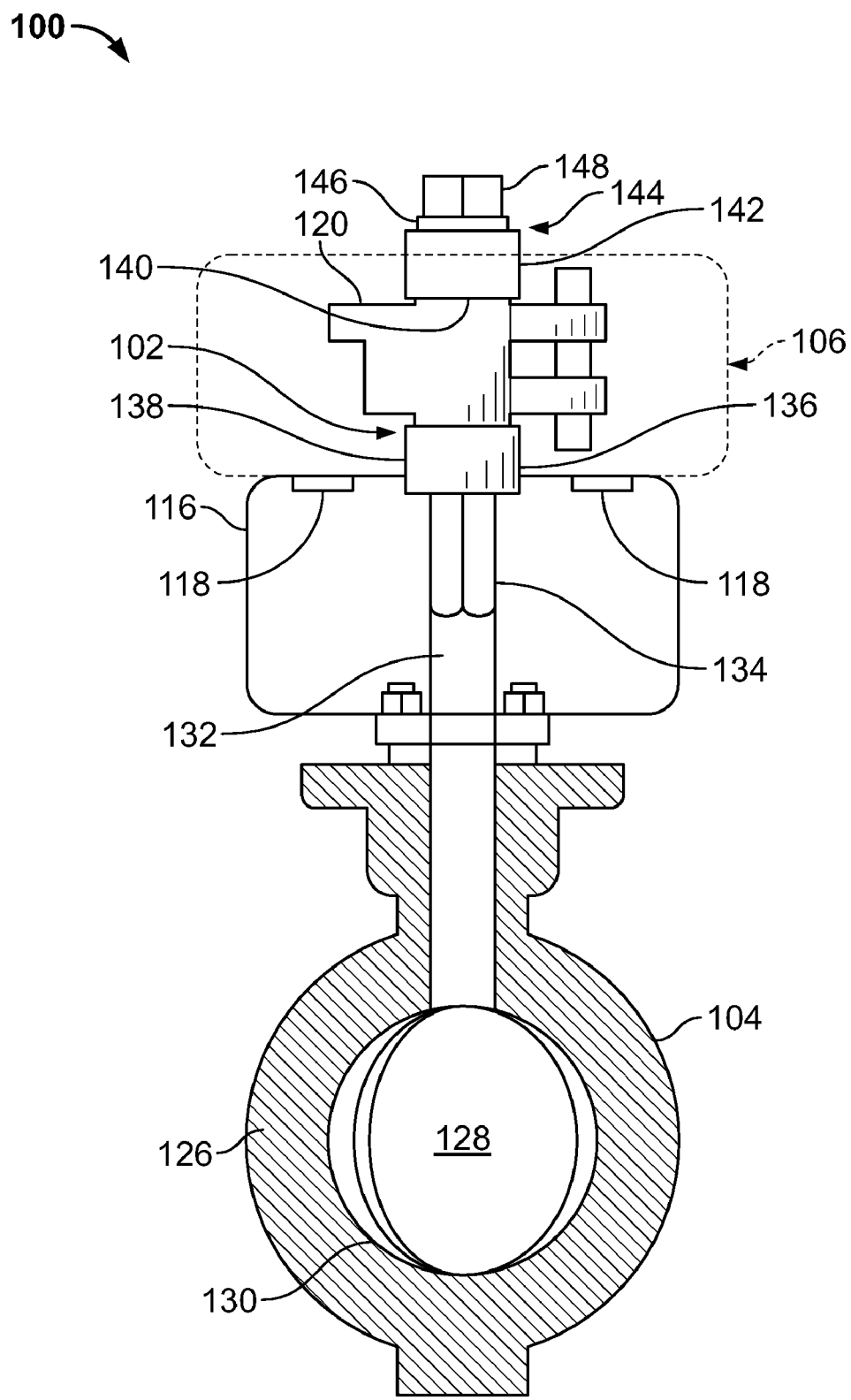
FIG. 1B illustrates a rotary valve that may be used to implement the rotary control valve assembly of FIG. 1A.

FIG. 1A illustrates an example rotary control valve assembly 100 having an example coupling assembly 102 described herein. FIG. 1B illustrates a rotary valve 104 that may be used to implement the rotary control valve assembly 100 of FIG. 1A. In general, the example valve assembly 100 includes an actuator 106 operatively coupled to the rotary valve 104 via the coupling assembly 102. The actuator 106 is configured to actuate (i.e., rotate, turn, etc.) to open/close the rotary valve 104 to control the flow of fluid through the valve 104.

Referring to FIG. 1A, the actuator 106 (e.g., a diaphragm actuator, a piston actuator, etc.) is coupled to a housing 108 of the rotary control valve 100. The housing 108 includes a first faceplate 112 and a second faceplate (not shown) opposite the first faceplate 112 (i.e., the backside of the actuator 106). The first faceplate 112 and the second faceplate are substantially similar or identical, which enables a field configurable fail-safe operation of the actuator 106. The first faceplate 112 includes a plurality of mounting holes 114 for mounting the rotary valve 104 to the actuator 106. A mounting bracket 116 (FIG. 1B) mounts the rotary valve 104 to the faceplate 112 via fasteners 118 (FIG. 1B) or any other suitable fastening mechanism that passes into and/or through the mounting holes 114.

As illustrated in FIG. 1A, the first faceplate 112 is removed from the actuator 106 to expose the coupling assembly 102. The coupling assembly 102 includes an example lever 120 that couples to or engages an example collet 122. The assembly of the lever 120 and the collet 122 is described in greater detail below. The collet 122 operatively couples the rotary valve 104 to the actuator 106. The actuator 106 includes an actuator stem (not shown) having a rod end bearing 124 that couples to the lever 120.

Referring to FIG. 1B, the rotary valve 104 includes a valve body 126 that houses a flow control member 128 and a seating surface or seal ring 130. The flow control member 128 engages the seal ring 130 to control the flow of fluid through the valve 104. The flow control member 128 is coupled to a valve shaft 132 which, in turn, is coupled to the lever 120 via the collet 122. The valve shaft 132 has a substantially square end 134 and may conform to an ISO standard for square shafts. However, the valve shaft 132 may be implemented using any other shape (e.g., any polygonal shape) and/or size. As described in greater detail below, the collet 122 is configured to apply a clamping force to the valve shaft 132 of the rotary valve 104 when the collet 122 is coupled to the lever 120.

As shown in FIG. 1B, a first end 136 of the lever 120 provides a first sleeve 138 that is configured to receive or engage the example collet 122 to form the coupling assembly 102. In a similar manner, a second end 140 of the lever 120 provides a second sleeve 142 through which the example collet 122 may be inserted to form a second coupling 144. The example collet 122 may be drawn into the lever 120 so that the first sleeve 138 or the second sleeve 142 engages the example collet 122. As described in greater detail below, the lever 120 engages a washer 146 and a fastener 148 draws the collet 122 within the lever 120 to cause the collet 122 to apply a clamping force to the valve shaft 132.

In operation, the rotary control valve assembly 100 receives a control signal such as, for example, compressed air, to displace the actuator 106. The displacement of the actuator 106 results in a corresponding linear displacement of the actuator stem. The linear displacement of the actuator stem is converted into a rotational displacement of the lever 120, whereby the lever 120 imparts a rotational force to the valve shaft 132 via the collet 122. For example, as the lever 120 rotates, the collet 122 rotates the valve shaft 132 to cause the flow control member 128 to rotate to a desired angular position to vary or control the fluid flowing through the rotary valve 104. When the flow control member 128 is closed, the flow control member 128 engages the seal ring 130 that encircles the flow path through the rotary valve 104 to prevent the flow of fluid through the valve 104.

Throttling the flow control member 128 may involve adjusting and controlling the position of the flow control member 128 between a fully open position and a fully closed position to achieve a desired process fluid flow and/or pressure. In addition, throttling the flow control member 128 may be performed in connection with a feedback system (not shown) that is configured to continually measure the flow and/or pressure of a process fluid. The feedback system may then cause, for example, the actuator 106 to at least partially actuate the lever 120 in response to changes in the flow and/or pressure of the process fluid. In throttling applications, minimizing or reducing lost motion between the lever 120 and the valve shaft 132 is important to achieving precise positioning of the flow control member 128. Such lost motion typically causes the actual position of a flow control member to deviate from a desired position. Substantially reducing or preventing such lost motion from occurring provides more accurate and improved valve performance.

Figure 2A:
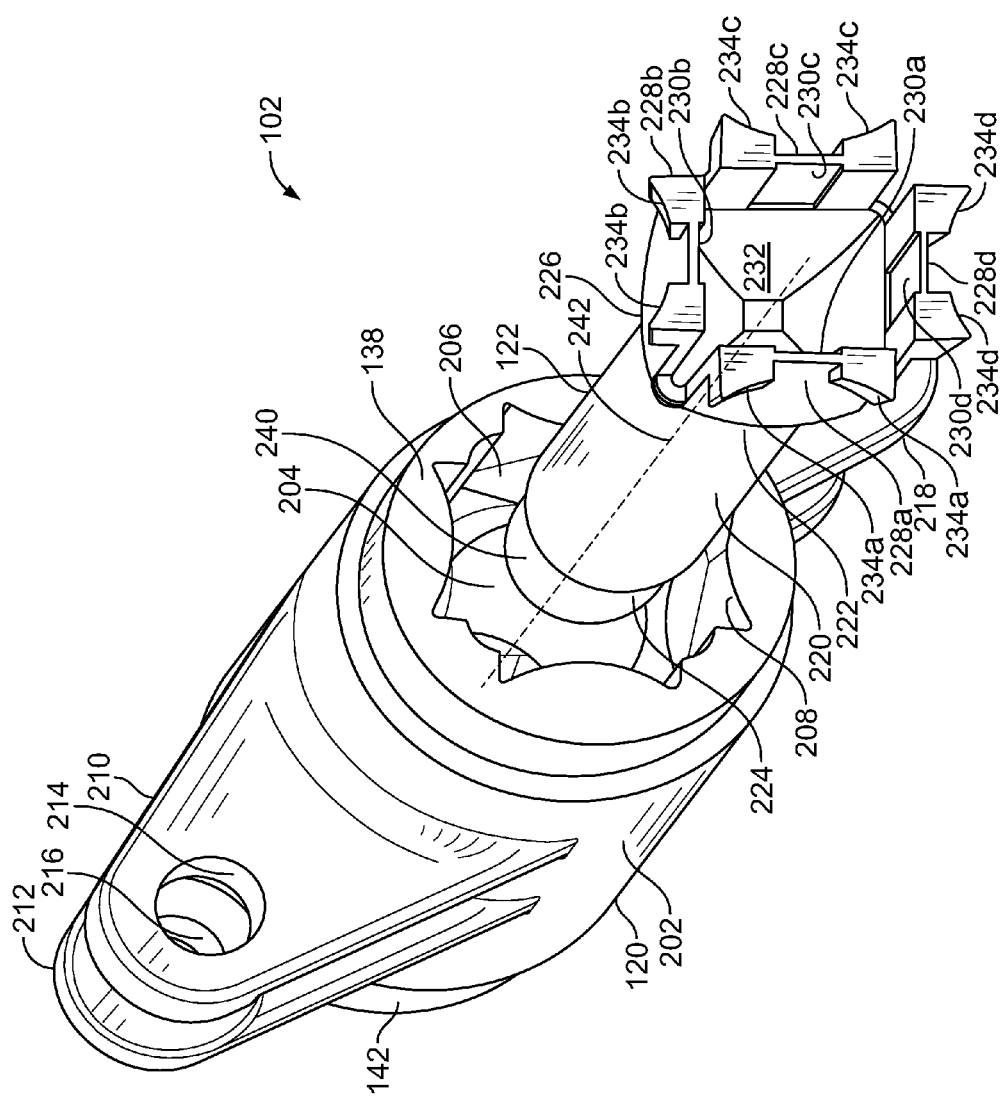
FIG. 2A illustrates the example collet and lever of FIGS. 1A and 1B.
Figure 2B:
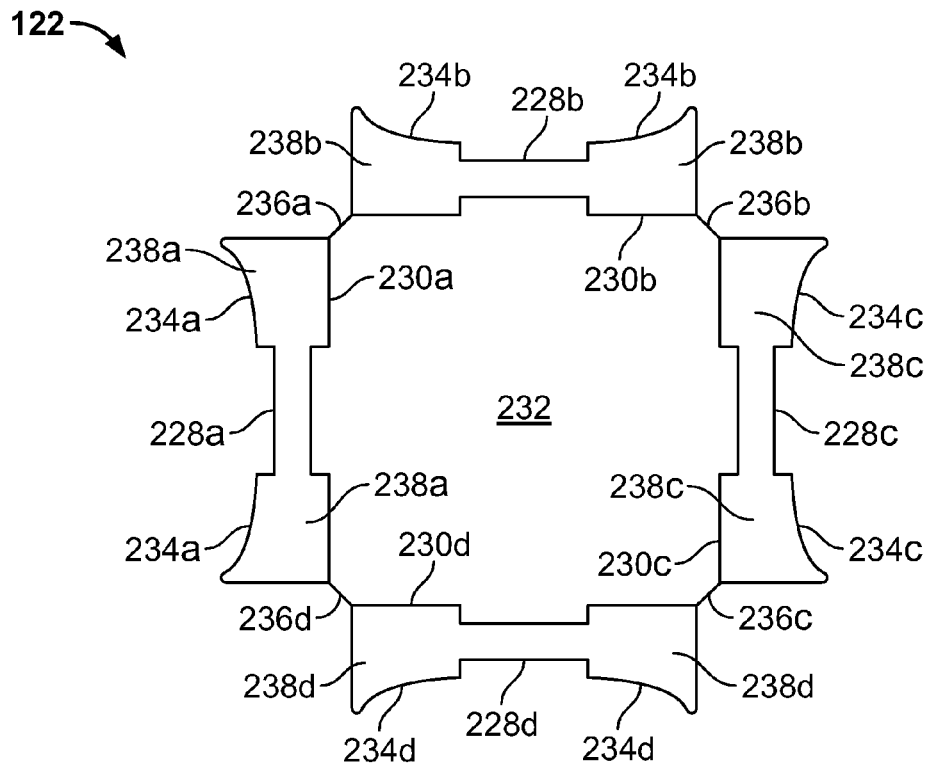
FIG. 2B illustrates an end view of the example collet of FIG. 2A

FIG. 2A illustrates the example lever 120 and the example collet 122 shown in FIG. 1A. FIG. 2B is a front view of the example collet 122 of FIGS. 1A and 2A. As stated above, in an assembled configuration, the example lever 120 and the example collet 122 form a coupling such as, for example, shown in FIGS. 1A and 1B. The lever 120 includes a body 202 having a first opening or aperture 204 substantially near the center of the body 202. The sleeve 138 includes a second opening 206 having a diameter that is larger than the diameter of the opening 204. The second opening 206 has at least one involute-shaped inner surface 208 that tapers toward the first opening 204. In some examples, the second sleeve 142 of the lever 120 may also include a third opening (not shown) opposite the second opening 206 having an involute-shaped inner surface that tapers toward the first opening 204. In the illustrated example, the sleeves 138 and 142 are integrally formed with the lever 120. However, in other examples, the sleeves 138 and/or 142 may be received by or coupled to the lever 120 in any other suitable manner(s).

The lever 120 includes lever arms 210 and 212 that extend from the body 202. The arms 210 and 212 include apertures or mounting hole 214 and 216, respectively, to receive a fastener (not shown) to rotatably couple the lever 120 to the rod end bearing 124 (FIG. 1A) of the actuator stem. Additionally, the body 202 may include a cam 218 that operatively couples to a positioner (not shown), which provides feedback to control the valve 100 based on the position on the cam 218.

Referring to FIGS. 2A and 2B, the collet 122 includes an elongate member 220 having a first end 222 and a second end 224. The first end 222 includes a coupling portion 226 that includes a plurality of flexible members 228a-d having respective inner surfaces 230a-d that form a substantially square bore 232 configured to receive a square valve shaft, such as, for example the valve shaft 132 of FIG. 1B. In the illustrated example, the coupling portion 226 is integrally formed with the elongate member 220 to form a substantially unitary piece or structure. However, in other examples, the coupling portion 226 couples to the elongate member 220 via any suitable fastening mechanism(s).

The plurality of flexible members 228a-d include involute outer surfaces 234a-d. Ones of the involute outer surfaces 234a-d engage the involute inner surface 208 of the second opening 206. In addition, the outer surfaces 234a-d of the flexible members 228a-d are tapered to matably engage the tapered surface 208 of the second opening 206. The plurality of flexible members 228a-d may be formed by slits 236a-d. The involute outer surfaces 234a-d advantageously provide the flexible members 228a-d with thicker dimensioned material 238a-d adjacent corners of the substantially rectangular bore 232, which is where the most effective torque transmission occurs between the collet 122 and the valve shaft 132 when the actuator 106 actuates to rotate the lever 120. Thus, the thicker material 238a-d enable the flexible members 228a-d to provide a more effective clamping force when coupled to a valve shaft.

As the collet 122 is drawn into the lever 120, the tapered surface 208 of the second opening 206 engages the tapered involute outer surfaces 234a-d to cause the flexible members 228a-d to be flexed or driven toward an axis 242 of the elongated member 220, which causes the flexible members to flex to decrease the dimensions of the square bore 232. In this manner, the example collet 122 may directly engage, for example, the valve shaft 132, thus reducing and/or eliminating any gaps between the surfaces of the square bore 232 and the surfaces of the valve shaft 132. When a shaft (e.g., the valve shaft 132 of FIG. 1B) is positioned within the bore 232, the inner clamping surfaces 230a-d directly engage and apply a clamping force to the valve shaft 132 so that a substantially tight fit is achieved between the inner clamping surfaces 230a-d and one or more surfaces of the valve shaft 132. Lost rotational motion (i.e., lost motion) between the lever 120 and the valve shaft 132 is substantially reduced or eliminated by eliminating the gaps between the surfaces of the square bore 232 and the valve shaft 132 via the example collet 122. Additionally, as the collet 122 is drawn or pulled by the draw nut 148 into the lever 120, the involute inner surface 208 of the sleeve 138 matably engages the involute outer surfaces 234a-d of the flexible members 228a-d to provide a tight coupling between the lever 120 and the collet 122 to further reduce or minimize lost motion between the lever 120 and the collet 122.

As the collet 122 is drawn into the lever 120, the tapered surface 208 of the second opening 206 engages the tapered involute outer surfaces 234a-d to cause the flexible members 228a-d to be flexed or driven toward an axis 242 of the elongated member 220, which causes the flexible members to flex to decrease the dimensions of the square bore 232. In this manner, the example collet 122 may directly engage, for example, the valve shaft 132, thus reducing and/or eliminating any gaps between the surfaces of the square bore 232 and the surfaces of the valve shaft 132. When a shaft (e.g., the valve shaft 132 of FIG. 1B) is positioned within the bore 232, the inner clamping surfaces 230a-d directly engage and apply a clamping force to the valve shaft 132 so that a substantially tight fit is achieved between the inner clamping surfaces 230a-d and one or more surfaces of the valve shaft 132. Lost rotational motion (i.e., lost motion) between the lever 120 and the valve shaft 132 is substantially reduced or eliminated by eliminating the gaps between the surfaces of the square bore 232 and the valve shaft 132 via the example collet 122. Additionally, as the collet 122 is drawn or pulled by the drawnut 148 into the lever 120, the involute inner surface 208 of the sleeve 138 matably engages the involute outer surfaces 234a-d of the flexible members 228a-d to provide a tight coupling between the lever 120 and the collet 122 to further reduce or minimize lost motion between the lever 120 and the collet 122.

Over time and through the continuous operation of a valve (e.g., the valve 100 of FIGS. 1A and 1B), the surfaces of the valve shaft may wear. This may cause loosening of the initial coupling between a shaft and an actuator. However, with the example collets described herein such as, for example, the example collet 122, a substantially tight fit or coupling between an actuator (e.g., the actuator 106) and valve shaft (e.g., the shaft 132) may be maintained or easily restored by tightening the draw nut 148 or bolt to draw the example collet 122 further within the sleeve 138 of the lever 120 and further displace the flexible members 228a-d toward the shaft.

The involute surfaces of the example collet 122 and/or sleeve 138 may be formed via investment casting, or any other suitable process(es). Additionally, although the example collet 122 is shown as having four flexible members 228a-d, it is possible to implement the example collet 122 using fewer or more flexible members. For example, the example collet 122 may be implemented using a single flexible member that applies a force to one of the surfaces of the valve shaft 132. In such a case, an inner surface of the flexible member at least partially defines a portion of a rectangular bore of the collet and an outer surface of the flexible member at least partially defines a portion of an involute outer surface of the collet.

Figure 3B:
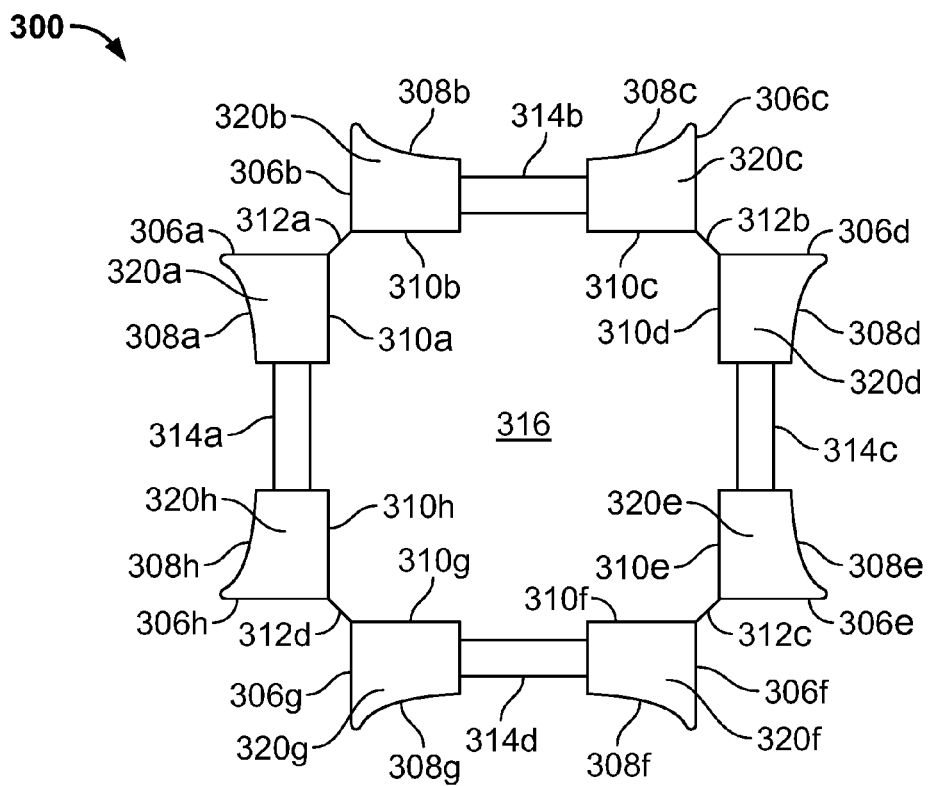
FIG. 3B illustrates an end view of the example collet of FIG. 3A.
Figure 3A:
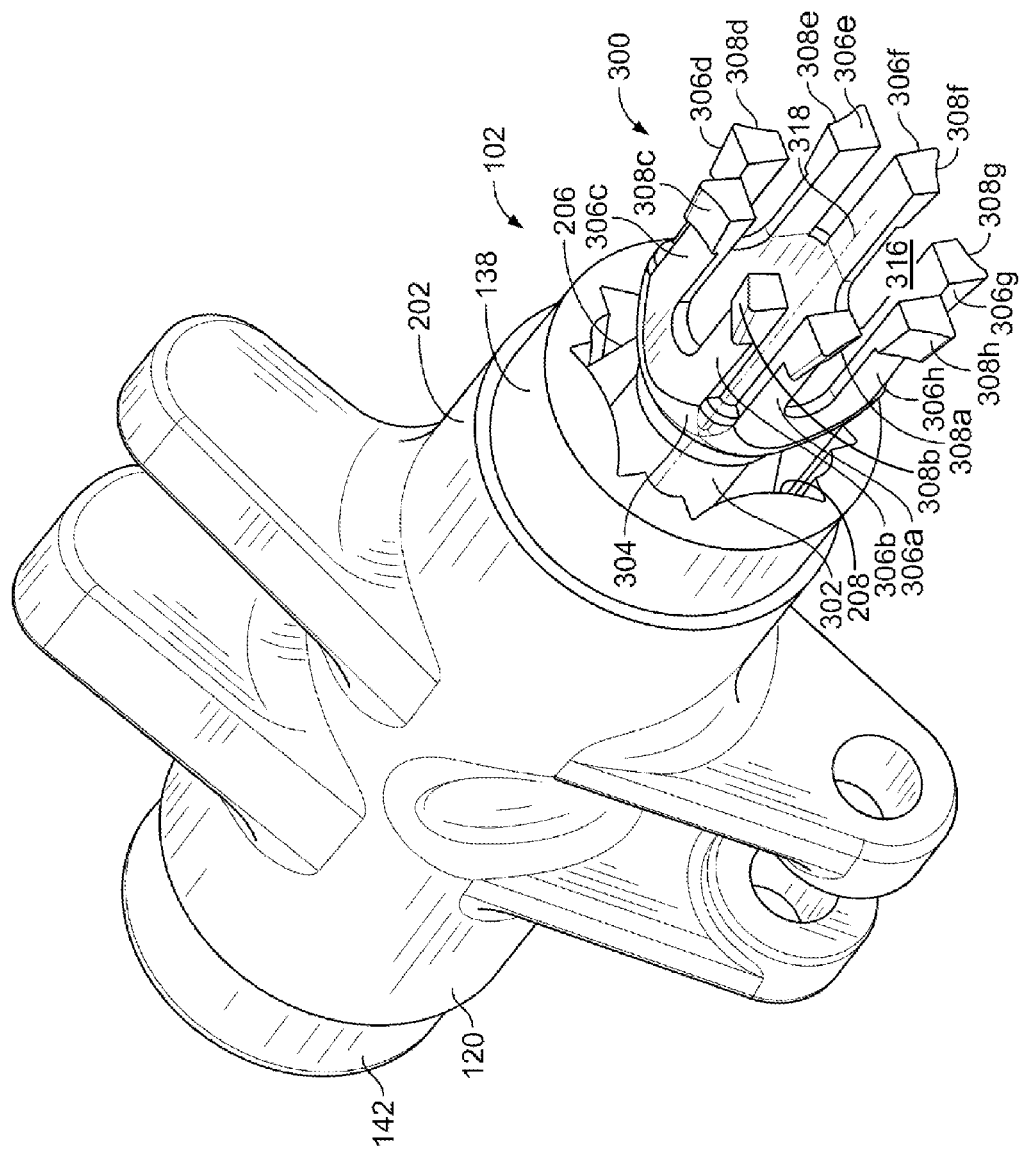
FIG. 3A illustrates another example collet described herein.

FIG. 3A illustrates another example collet 300 described herein that is implemented with more flexible members than the example collet 122 of FIGS. 1A, 2A and 2B. FIG. 3B is an end view of the example collet 300 of FIG. 3A. Referring to FIGS. 3A and 3B, the example collet 300 includes an elongate member 302 and a coupling portion 304. The coupling portion 304 includes a plurality of flexible members 306a-h. The plurality of flexible members 306a-h have respective tapered involute outer surfaces 308a-h and a plurality of substantially planar inner clamping surfaces 310a-h. The plurality of flexible members 306a-h may be formed by slits or openings 312a-d and 314a-d. Each of the flexible members 306a-h provides a corresponding one of the inner clamping surfaces 310a-h and a corresponding one of the involute outer surfaces 308a-h. In this example, the inner clamping surfaces 310a-h form a substantially rectangular or square bore 316 configured to receive a substantially square shaft (e.g., the valve shaft 132 of FIG. 1B).

The example collet 300 is received by the lever 120 in substantially the same manner as the collet 122 is received by the lever 120, as described in connection with FIGS. 1A, 1B, 2A and 2B. The coupling portion 304 engages the second opening 206 of the lever 120 so that the involute inner surface 208 of the second opening 206 engages the involute outer surfaces 308a-h of the flexible members 306a-h. As the collet 300 is drawn into the lever 120, the tapered inner involute surface 208 of the second opening 206 engages the tapered involute outer surfaces 308a-h to flex or displace the flexible members 306a-h toward an axis 318 of the collet 300. In this manner, when the collet 300 is drawn into the sleeve 138, the flexible members 306a-h are displaced toward and directly engage a valve shaft, for example, the valve shaft 132 of FIG. 1B.

In particular, when the sleeve 138 receives the example collet 300 (i.e., the collet 300 is drawn into the sleeve 138), the inner surfaces 310a-h may directly engage the surfaces of the valve shaft 132 to provide a clamping force to the valve shaft 132. Additionally, the openings 314a-d enable the flexible members 306a-h to be more flexible than, for example, the flexible members 228a-d of the example collet 122. Such flexibility causes the flexible members 306a-h to be forced toward the mating involute inner surface 208 of the sleeve 138. In this manner, the flexible members 306a-h advantageously form independently acting wedges that engage the lever 120 to further minimize lost motion between the collet 300 and the lever 120.

As discussed above, the involute outer surfaces 308a-h advantageously provide the flexible members 306a-h with thicker dimensioned material 320a-h adjacent the corners of the substantially rectangular bore 316, which is where the most effective torque transmission occurs between the lever 120 and a valve shaft (e.g., the valve shaft 132) when an actuator (e.g., the actuator 106) rotates the lever 120. The thicker material 320a-h enables the flexible members 306a-h to provide a more effective clamping force when coupled to a valve shaft. Additionally, the involute outer surfaces 308a-h matably engage the involute inner surface 208 to provide an improved connection between the lever 120 and the collet 300 to further reduce lost motion between the collet 300 and the lever 120.

The lever 120, the example collets 122 and 300, and the sleeve 138 or fastening component are exemplary depictions and may be implemented by any suitable lever, shaft clamp, and fastening component configured to provide direct engagement of a shaft and minimal or substantially zero lost motion between the collets, the shaft, and the lever.

Although certain methods, apparatus, and articles of manufacture have been described herein, the scope of coverage of this patent is not limited thereto. To the contrary, this patent covers all methods, apparatus, and articles of manufacture fairly falling within the scope of the appended claims either literally or under the doctrine of equivalents.

What is claimed is:

1. A shaft coupling assembly for use with rotary valves, comprising:
    an elongate member having a first end and a second end, wherein the first end includes a coupling portion having an outer surface and a first opening configured to receive a rectangular shaft, wherein the coupling portion includes at least one flexible member having a first surface that at least partially defines the first opening and a second surface that at least partially defines the outer surface, wherein the flexible member has a variable thickness in a direction normal to the first surface, and wherein the thickness is greatest at a position adjacent a corner of the first opening; and
    a sleeve having a second opening to receive the elongate member and a third opening having an inner surface configured to receive the outer surface of the coupling portion.

2. A shaft coupling assembly as defined in claim 1, wherein the inner surface of the third opening tapers toward the second opening.

3. A shaft coupling assembly as defined in claim 1, wherein the outer surface of the coupling portion tapers toward the second end of the elongate member.

4. A shaft coupling assembly as defined in claim 2, wherein the tapered inner surface of the third opening is to cause the at least one flexible member to be displaced toward an axis of the elongate member to cause the first surface of the at least one flexible member to engage one or more surfaces of the rectangular shaft.

5. A shaft coupling assembly as defined in claim 1, further comprising at least another flexible member having a third surface opposing the first surface of the at least one flexible member, wherein the at least one flexible member and the at least another flexible member are configured to accept the rectangular shaft therebetween, and wherein the at least one flexible member and the at least another flexible member are configured to be displaced toward one another when the outer surface engages the inner surface of the third opening.

6. A shaft coupling assembly as defined in claim 1, wherein the second end of the elongate member is to couple the elongate member to the sleeve.

7. A shaft coupling assembly as defined in claim 6, wherein the second end of the elongate member is configured to engage at least one of a nut or a bolt.

8. A shaft coupling assembly as defined in claim 1, wherein the sleeve is integrally formed with a lever that is configured to be rotatably coupled to an actuator.

9. A shaft coupling assembly as defined in claim 1, further comprising a plurality of flexible members, wherein the plurality of flexible members and the at least one flexible member define the first opening that is configured to receive the rectangular shaft.

10. A collet for use with a rectangular shaft, the collet comprising:
    flexible members configured to be coupled to an elongated member and each having an inner surface that forms at least a portion of a substantially rectangular bore configured to receive the rectangular shaft and an inwardly curved outer surface for engaging corresponding inner surfaces of an opening of a lever, wherein the opening of the lever is configured to cause the flexible members to be displaced toward an axis of the elongated member to cause the inner surface of each of the flexible members to engage one or more surfaces of the rectangular shaft.

11. A collet as defined in claim 10, wherein the flexible members are configured to be coupled to a lever associated with an actuator.

12. A collet as defined in claim 10, wherein the elongated member is integrally formed with the flexible members.

13. A collet as defined in claim 10, wherein the flexible members are to apply a clamping force to the rectangular shaft when the inner surfaces of the flexible members engage the rectangular shaft.

14. A collet as defined in claim 10, wherein the elongated member includes a threaded portion configured to engage at least one of a nut or a bolt.

15. A rotary control valve, comprising:
a valve mounted to a housing and having a shaft;
an actuator operatively coupled to the valve and disposed within the housing;
a collet having flexible members integrally formed with an elongated member, wherein outer surfaces of the flexible members have inwardly curved surfaces, and wherein inner surfaces of the flexible members form a first opening to receive the shaft; and
a lever operatively coupled to the actuator having a second opening to receive the elongated member of the collet and a third opening having a tapered surface to engage the outer surfaces of the flexible members.

16. A valve as defined in claim 15, wherein the flexible members are configured to slide within the third opening, and wherein the tapered surface of the third opening engages the outer surfaces of the flexible members to cause the plurality of inner surfaces to engage the shaft.

17. A valve as defined in claim 16, wherein the outer surfaces of the flexible members are tapered.

18. A valve as defined in claim 15, wherein the elongated member includes a threaded end configured to extend through the second opening and engage at least one of a nut or a bolt to couple the collet to the lever.

19. A valve as defined in claim 15, wherein the shaft and the first opening are substantially rectangular.

20. A valve as defined in claim 15, wherein the actuator is one of an electric actuator, a pneumatic actuator, a hydraulic actuator, or a manually operated actuator.

21. A shaft coupling assembly as defined in claim 1, wherein the second surface of the at least one flexible member is an inwardly curved surface.

* * * * *